Figure 1:
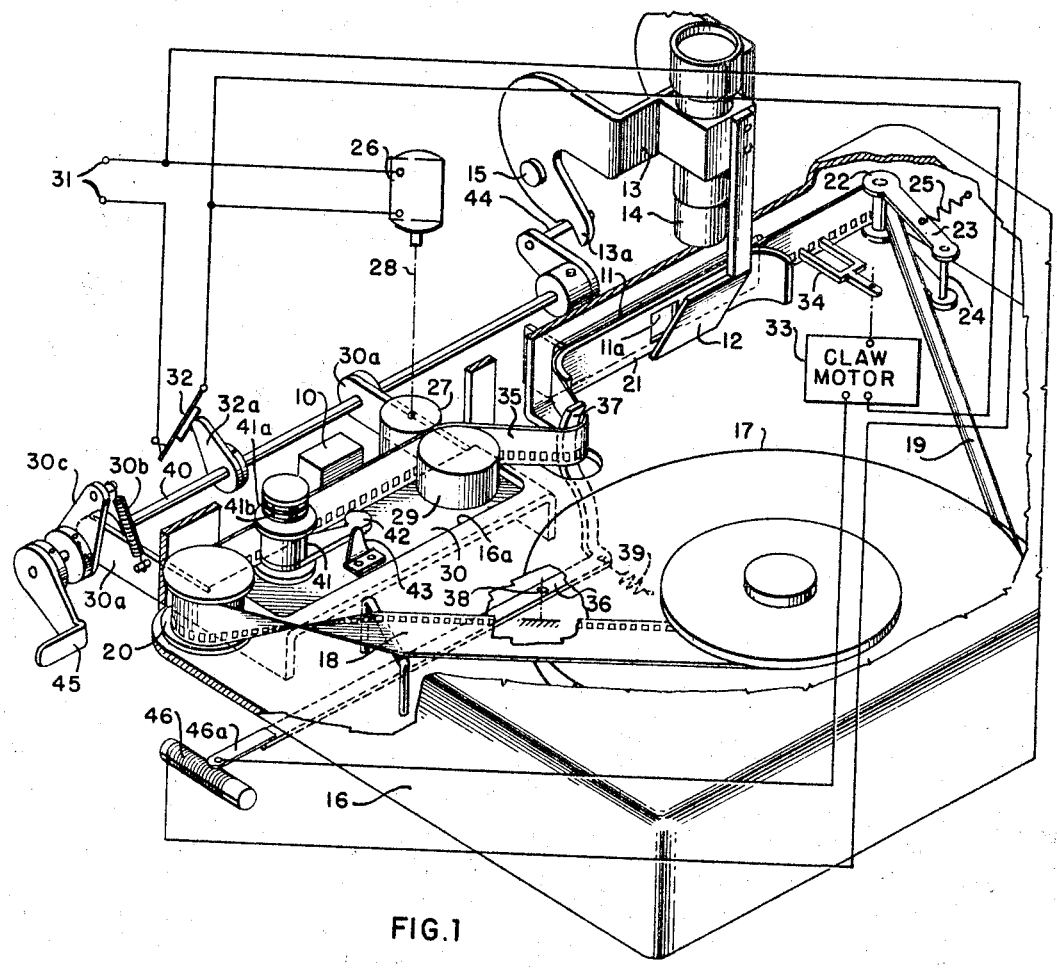

April 5, 1966 R. G. HENNESSEY ET AL 3,244,469
SOUND-AND-PICTURE-ON-FILM REPRODUCING APPARATUS
Filed Jan. 2, 1963

United States Patent Office 3,244,469
Patented Apr. 5, 1966

3,244,469
SOUND-AND-PICTURE-ON-FILM REPRODUCING
APPARATUS
Raymond G. Hennessey, Centerport, Hans F. Napfel, Yonkers, and Lee H. Schank, West Nyack, N.Y., assignors to Fairchild Camera and Instrument Corporation, a corporation of Delaware
Filed Jan. 2, 1963, Ser. No. 249,092
10 Claims. (Cl. 352—14)

This invention relates to sound-and-picture-on-film reproducing apparatus and particularly to such apparatus permitting the use of readily interchangeable film magazines and having improved sound and picture reproduction.

In current sound-and-picture-on-film reproducing apparatus, it is customary to transport the film from a supply spool to a take-up spool by means of a sprocket engaging the film sprocket holes and pulling the film at constant speed from a supply spool and to provide means for converting the motion of the film to intermittent motion as it passes the projection gate and means, such as a constant-speed capstan, for converting the intermittent motion of the film, after it leaves the gate, to a constant speed as it passes the sound-scanning device, together with a constant-speed drive on the take-up spool. Slack loops are formed on both sides of the projection gate between the supply and take-up spools to make allowance for the differences in the instantaneous velocities of the film as it passes through the several points of the system.

A film transport system of the type described has a number of disadvantages. Ordinarily, separate drives are required for the supply spool and the take-up spool with a slip clutch to take account of the varying winding diameters of the film on the spools. In addition, such apparatus generally includes a separate constant-speed film drive on either side of the gate so that the complete film transport apparatus is complex and costly. The apparatus for establishing the constant film speed as it passes the sound-scanning device is usually a constant-speed capstan. However, the film tends to change in length with variations in temperature and humidity so that the number of frames passing the sound-scanning device, per unit of time, varies slightly. Consequently, some means is required for compensating for the difference in the quantity of film passing the gate, which is metered in terms of the number of frames, and that passing the sound-scanning device, which is metered in terms of the number of inches per unit time. No completely satisfactory compensating apparatus for this purpose has been devised and such mechanism as has been proposed is complex and costly. For example, such compensating apparatus frequently includes an auxiliary sprocket for pulling the film past the capstan to compensate for metering errors.

Moreover, it is current practice to dispose the sound record approximately 56 frames ahead of the picture and to dispose the sound-scanning device at a point in the film travel after it has undergone a change from the constant speed as it is withdrawn from the supply spool to an intermittent speed as it passes the film gate and back to a constant speed as it is supplied to the take-up spool. It has been found that, in practice, it is difficult to eliminate residual itermittent and irregular motions after such double speed conversion, resulting in flutter and otherwise impairing the quality of the sound program.

In addition, when apparatus of the type described is used for showing closed loop repetitive programs, such as used in advertising, visual instruction, etc., any slight difference in the average of the intermittent speed of the film as it passes the film gate and the constant speed as it passes the sound-scanning device becomes cumulative and tends to eliminate one of the slack loops, rendering the apparatus inoperative. For example, if in splicing such a closed loop one or more sprocket holes are missed, one sprocket hole would be lost during each round trip passage of the film past the gate, which will eventually eliminate the slack loop beyond the gate.

It is an object of the invention, therefore, to provide a new and improved sound-and-picture-on-film reproducing apparatus which is relatively simple, compact, and inexpensive in construction.

It is another object of the invention to provide a new and improved sound-and-picture-on-film reproducing apparatus capable of improved sound reproduction.

It is another object of the invention to provide a new and improved film transport for such a reproducing apparatus which is continuously effective automatically to compensate for variations in film length, due to variations in temperature, humidity, etc., as well as to errors in splicing a closed film loop.

It is another object of the invention to provide a new and improved film transport apparatus for such a reproducing apparatus which operates with a single slack loop of a length automatically maintained within close limits.

In accordance with the invention, there is provided a sound-and-picture-on-film transport apparatus for a sound-and-picture reproducer including a sound-scanning device and a film gate comprising a combined film supply and take-up reel, means for guiding the film from and to the reel, a constant-speed device disposed beyond the sound-scanning device in the direction of film motion for engaging the film and withdrawing it from the supply means, an intermittently operating mechanism for advancing the film past the film gate, an element extending transversely of an biased continuously to engage the film throughout each frame cycle for normally forming a loop between the gate and the sound-scanning device to take into account the difference between the instantaneous film velocities at the sound-scanning device and at the film gate, and a path for returning the film after passing the gate directly to the take-up reel, the arrangement of the sound-scanning device, the constant-speed device, and the film gate being such that the film moves in substantially a straight line across the apparatus except for the slack loop.

Further is accordance with the invention, there is provided a sound-and-picture-on-film transport apparatus for a sound-and-picture reproducer including a sound-scanning device and a film gate comprising means for supplying and taking up film, a constant-speed device disposed beyond the sound-scanning device in the direction of film motion for engaging the film and withdrawing it from the supply means, and an intermittently operating device for advancing the film past the film gate. The apparatus further comprises an arm extending transversely of the film and continuously acting on the same to from a loop between the gate and the sound-scanning device to take into account the difference between the instantaneous film velocities at the sound-scanning device and at the film gate, a path for returning the film after passing the gate directly to the film take-up means, and means continuously responsive to the average position of the arm for continuously controlling the speed of one of the devices to control the slack loop.

For a better understanding of the present invention, together with other and further objects thereof reference is had to the following description, taken in connection with the accompanying drawing, while its scope will be pointed out in the appended claims.

Figure 2:
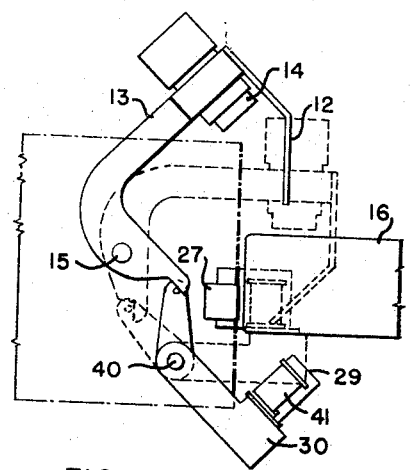
Figure 3:
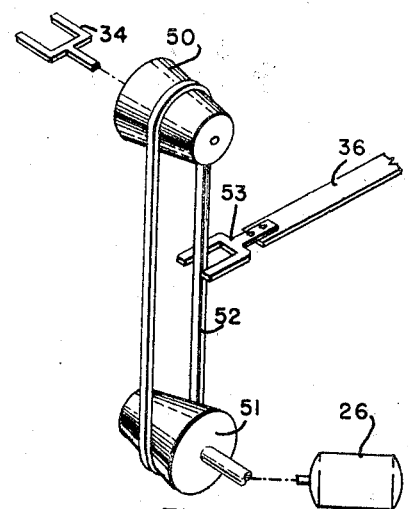

Referring now to the drawing:
FIG. 1 is a perspective view, partly schematic, of a complete sound-and-picture-on-film reproducing apparatus embodying the invention;

FIG. 2 is an end view of the mechanism for registering the film with the sound-scanning device and constant-speed drive after insertion of the film magazine, while FIG. 3 is a fragmentary view of a modified form of automatic slack loop control.

Referring now to FIG. 1 of the drawing, there is shown a sound-and-picture-on-film reproducing apparatus comprising a sound-scanning device 10, shown schematically since it comprises no part of the present invention and may comprise any form of sound pickup means, and a film gate 11 including a projection aperture 11a. The source of illumination of the film is convention and not shown. The light projected through the film and the aperture 11a is reflected upwardly by a mirror 12 secured to a frame 13 carrying an optical lens system 14 for projecting the picture on a screen, not shown. The optical projection system is adaptable to front or rear projection by conventional means. The frame 13 is pivotally mounted at 15 for purposes described hereinafter.

The reproducing apparatus includes a readily engageable and disengageable film magazine 16 including means for supplying and taking up film, for example a combined supply and take-up spool 17, in which one course 18 of the film is withdrawn from the center of the spool while the returning course 19 is rewound at the outer periphery of the stock of film on the spool, such a combined supply and take-up spool being well known in the art. However, the means for supplying and taking up film may comprise separate supply and take-up spools.

The film magazine 16 further includes an idler or guide roller 20, a film guide plate 21 forming a part of the film gate 11, and a film guide or roller 22 mounted on a bracket 23 pivoted at 24 and biased by a spring 25 to exert a light tension on the return course 19 of the film and to act in lieu of a slack loop at this point to compensate for the difference between the substantially constant instantaneous velocity of the returning course 19 of the film as it is wound on the spool 17 and the intermittent motion of the film as it passes the film gate 11. The frame of the apparatus (not shown) will ordinarily include conventional guides or slides for inserting the magazine into the apparatus stops for determining its final location, and latches for locking it in place.

The reproducing apparatus includes a constant-speed device, such as constant-speed motor 26, and a driving capstan 27 interconnected by the mechanism schematically indicated at 28 which will include an appropriate speed-changing device. The capstan 27 cooperates with a pinch roller 29 mounted on a bracket 30, further described hereinafter. The capstan 27 and pinch roller 29 are disposed beyond the sound-scanning device 10 in the direction of film motion and engage the film and withdraw it from the supply spool 17 in a conventional manner. The motor 26 is adapted to be energized from suitable supply terminals 31 through a switch 32 operated as described hereinafter.

The reproducing apparatus further includes an intermittent operating mechanism including a claw motor 33 and a claw 34 for engaging the sprocket holes in the film and for advancing the film intermittently past the film gate 11, these elements being shown schematically since they are well-known conventional devices.

The reproducing apparatus further includes means for normally forming a slack loop of film 35 of predetermined length between the sound-scanning device 10 and the gate 11 to compensate for differences in the instantaneous velocities of the film at these two points. This means comprises a crank 36 including an upstanding resilient arm 37 extending transversely of the film to form the slack loop 35. The crank 36 is pivoted about an axis 38 substantially parallel to the normal position of the arm 37, the crank 36 being biased by a spring 39 in a direction to form the slack loop 35.

As shown in the drawing, the arrangement of the several parts described is such that the film moves in substantially a straight line across the apparatus as it passes from the idler roll 20 to the roll 22, except for the slack loop 35. This arrangement has the particular advantage of accommodating film magazines of different sizes and being adaptable to automatic magazine changing apparatus, it being only necessary that the guide plate 21 attached to the magazine 16 be in proper registry with the remaining elements of the film gate 11.

The reproducing apparatus further comprises means retractable from the path of the film magazine 16 during its insertion in the apparatus and movable to engage the film with the sound-scanning device and the constant-speed capstan 27 after the film magazine is inserted in the apparatus. This means comprises a pivoted assembly including the bracket 30 having extending arms 30a, 30a pivotally mounted on a shaft 40 journalled in the frame of the apparatus, not shown. One of the arms 30a is connected by way of a spring link 30b to a crank 30c secured to shaft 40. The bracket 30 carries a film guide 41 serving accurately to space the film vertically, a pressure arm 42 having a light bias spring 43 to ensure a close engagement between the film and the sound-scanning device 10, and the pinch roller 29 referred to above, which effects a driving engagement between the film and the capstan 27. The film guide 41 includes an axially adjustable upper flange 41a lightly biased downwardly by a spring 41b to bias the film downwardly against its lower fixed flange. The lower wall of the magazine 16 has an opening or cutout 16a to permit pivotal movement of the assembly from the position shown in full lines in FIG. 2 through such wall opening after insertion of the film magazine 16 to effect engagement of the film, as described.

The frame 13 for carrying the optical elements is provided with an extending arm 13a which engages a crank pin 44 secured to the shaft 40. A lever 45 is also secured to shaft 40 so that operation of the lever 45 is effective to move the bracket 30 and its assembly of elements and the frame 13 and its assembly of elements between the fully retracted positions, shown in solid lines in FIG. 2, to the operative positions shown in dotted lines in that figure. The lever 45 may be operated manually or by remote positioning mechanism to effect rotation of the shaft 40. An arm 32a is secured to the shaft 40 for operating the switch 32.

The reproducing apparatus further comprises means continuously responsive to the position of the slack forming arm 37 for varying the speed of the intermittent advancing mechanism comprising the elements 33 and 34. Specifically, the claw motor 33 is shown as connected to be energized from the supply terminals 31 through switch 32 and a resistor 46 having an adjustable contact 46a carried by the crank 36 so that, as the slack loop 35 expands or contracts, the amount of resistance in the circuit of the claw motor 33 is varied to vary the speed of the intermittent film advancing mechanism 33, 34 to restore the length of the slack loop to substantially its normal value. It is understood that the complete apparatus will include an amplifier for the sound-scanning device 10, a loudspeaker therefor, and a source of illumination for the film gate 11, these elements not being shown in the drawing since they comprise no part of the present invention.

It is believed that the operation of the sound-and-picture-on-film reproducing apparatus of the invention will be clear from the foregoing description. In brief, the lever 45 is initially operated to retract the bracket 30 and the frame 13 from their normal positions as shown in dotted lines in FIG. 2. The film magazine 16 is then inserted into the apparatus, being properly positioned by suitable guides not shown. As it is moved into position, the film between the idler roller 20 and the film gate 11 is engaged by the arm 37 which tends to form the initial slack loop but, due to the force required to release the film, the arm 37 and crank 36 are initially deflected so that the length of the slack loop is less than normal.

After the magazine 16 is in place, the arm 45 is manually actuated to effect three operations. First, the bracket 30 and its assembled elements are rotated about the axis of shaft 40 into position so that the pinch roller 29 engages the film with the driving capstan 27, the pressure arm 42 presses the film into engagement with the sound-scanning device 10, and the guide roller 41 vertically positions the film. Movement of the bracket 30 is limited by the engagement of the pinch roller 29 with the capstan 27, in which position the upper surface of the bracket 30 lies below the lower surface of the magazine 16. Second, the frame 13, including the lens system 14 and the mirror 12, moves about its pivotal axis 15 into position so that the mirror 12 registers with the aperture 11a of the film gate and, third, after completion of the two preceding operations, the arm 32a closes the switch 32 to energize the motors 26 and 33 to transport the film through the apparatus. Ordinarily, the switch 32 will concurrently turn on the projection lamp for illuminating the film in the gate 11 and the power supply and amplifier for the sound-scanning device 10 and the apparatus is placed in normal operation. Since the crank 36 has been actuated to cut substantially all of the resistance 46 into the circuit of the claw motor 33, it operates at its minimum speed and relatively quickly builds up the slack loop 35.

If thereafter the slack loop 35 tends to expand or contract appreciably from its normal length, this change is sensed by the arm 37 which actuates the crank 36 to adjust the portion of the resistor 46 in the circuit of the claw motor 33, thereby adjusting its speed in a sense to compensate for the variation in the length of the slack loop 35.

The spring constants and the inertias of the parts 36, 37, and 39 are such that the assembly effectively has two time constants. The sensing arm 37 alone has a very small time constant and continuously engages the slack loop 35 and follows the variations in this loop over each frame cycle due to the instantaneous differences in the speed of the film past the sound-scanning device 10 and its intermittent motion through the film gate 11. However, the sensing arm 37 has a very light spring constant while the inertia of the crank 36 and connected parts is such that these rapidly fluctuating variations in the slack loop are not effective to actuate the crank 36. This sensing mechanism may be designed to have a cutoff frequency above about 10 cycles per second. However, for slower and gradual changes in the length of the slack loop 35, the sensing arm 37 and crank 36 continuously respond thereto and continuously adjust the value of the resistor 46 in series with the claw motor 33 to compensate for such variations at all times and to regulate the length of the slack loop 35 within narrow limits.

As pointed out above, the variation in the average speed of the film at the gate 11 is only that due to expansion and contraction of the film, termed stretching, arising from environmental changes. Such stretching is ordinarily less than a few percent and is not significant in the reproduction of motion pictures. Such variations in the average speed of the film at the gate 11 are only those required to match the constant average speed of the film at the capstan 27.

In the apparatus illustrated in FIG. 1, separate motors 26 and 33 are provided for driving the capstan 27 and the advancing claw 34, respectively. In some applications, there may be an advantage in utilizing a single motor for driving both of these devices. A fragmentary view of such a modification is shown in FIG. 3 in which the motor 26 driving the capstan 27 is also connected to drive the claw 34 through a variable-speed driving mechanism, such as the opposed cone pulleys 50 and 51 and driving belt 52, the position of which is adapted to be adjusted by a forked extension 53 of crank 36. Except for the method of varying the speed of the advancing claw 34, the operation of the apparatus including the modification of FIG. 3 is the same as that described above.

There are a number of differences between the sound- and-picture-on-film reproducing apparatus of the invention and prior apparatus of this type. In such prior apparatus, a sprocket wheel was ordinarily used to pull the film from the supply spool so that the film was metered in terms of a certain number of sprocket holes per unit of time. In applicants' improved apparatus, the film is pulled from the supply spool by a constant-speed capstan and pinch roll at a given number of inches per second and the sound-scanning device is disposed at this point of the film transport and before the motion of the film is converted to an intermittent motion at the film gate. This substantially eliminates flutter and other irregularities tending to impair the sound reproduction.

In prior apparatus of the type described, there were slack loops, each of which would tend to increase or decrease, due to expansion and contraction of the film with variations in temperature, humidity, etc. If a slack loop is allowed to increase in length cumulatively, it will ultimately clog the apparatus. Conversely, if it is allowed to contract cumulatively, it will finally elimnate the slack loop and render the apparatus inoperative. In applicants' improved apparatus, the loop sensor is continuously responsive to the length of the slack loop and continuously controls the speed of the intermittent motion mechanism for drawing the film through the gate so as to maintain its average speed equal to that of the constant speed of the film past the sound-scanning device. In this way, the slack loop is maintained at a substantially constant length, the control of the claw motor being at all times proportional to the position of the loop sensing arm. In practice, however, the range of adjustment of the claw driving motor lies within a narrow range of less than ±10% of the nominal speed of the motor. Therefore, the control may be very sensitive and fast-acting.

As pointed out above, the greater portion of all film manipulating devices has been removed from the film magazine so that it lends itself to ready engagement and disengagement and to use in automatic magazine-changing equipment. At the same time, the film manipulating devices in the apparatus itself, which require operation upon engagement and disengagement of a film magazine, are confined to a minimum, namely, the guide roller for determining the vertical position of the film, the pinch roll for engaging the film with the drive capstan, the pressure arm for the sound pickup, and the optical system for the visual projection. These elements are mounted on two brackets which partake of simple pivotal movement.

While there have been described what are, at present, considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. A sound-and-picture-on-film transport apparatus for a sound-and-picture reproducer including a sound-scanning device and a film gate comprising:
   (a) a combined film supply and take-up reel;
   (b) means for guiding the film from and to said reel;
   (c) a constant-speed device disposed beyond the sound-scanning device in the direction of film motion for engaging the film and withdrawing it from said supply reel;
   (d) an intermittently operating mechanism for advancing the film past the film gate;
   (e) an element extending transversely of and biased continuously to engage the film throughout each frame cycle for normally forming a loop between the gate and the sound-scanning device to take into account the difference between the instantaneous film velocities at the sound-scanning device and at the film gate;

(f) and a path for returning the film after passing the gate directly to said take-up reel;

(g) the arrangement of the sound-scanning device, the constant-speed device, and the film gate being such that the film moves in substantially a straight line across the apparatus except for said loop.

2. A sound-and-picture-on-film transport apparatus for a sound-and-picture reproducer including a sound-scanning device and a film gate comprising:
(a) a combined film supply and take-up reel;
(b) means for guiding the film from and to said reel;
(c) a constant-speed device disposed beyond the sound-scanning device in the direction of film motion for engaging the film and withdrawing it from said supply reel;
(d) an intermittently operating mechanism for advancing the film past the film gate;
(e) an arm extending transversely of and biased continuously to engage the film throughout each frame cycle for normally forming a loop between the gate and the sound-scanning device to take into account the difference between the instantaneous film velocities at the sound-scanning device and at the film gate;
(f) and a path for returning the film after passing the gate directly to said take up reel;
(g) the arrangement of the sound-scanning device, the constant-speed device, and the film gate being such that the film moves in substantially a straight line across the apparatus except for said loop.

3. A sound-and-picture-on-film transport apparatus for a sound-and-picture reproducer including a sound-scanning device and a film gate comprising:
(a) a combined film supply and take-up reel;
(b) means for guiding the film from and to said reel;
(c) a constant-speed device disposed beyond the sound-scanning device in the direction of film motion for engaging the film and withdrawing it from said supply reel;
(d) an intermittently operating mechanism for advancing the film past the film gate;
(e) a resilient biased arm extending transversely of and biased continuously to engage the film throughout each frame cycle for normally forming a loop between the gate and the sound-scanning device to take into account the difference between the instantaneous film velocities at the sound-scanning device and at the film gate;
(f) and a path for returning the film after passing the gate directly to said takeup reel;
(g) the arrangement of the sound-scanning device, the constant-speed device, and the film gate being such that the film moves in substantially a straight line across the apparatus except for said loop.

4. A sound-and-picture-on-film transport apparatus for a sound-and-picture reproducer including a sound-scanning device and a film gate comprising:
(a) a combined film supply and take-up reel;
(b) means for guiding the film from and to said reel;
(c) a constant-speed device disposed beyond the sound-scanning device in the direction of film motion for engaging the film and withdrawing it from said supply reel;
(d) an intermittently operating mechanism for advancing the film past the film gate;
(e) a crank including an arm extending transversely of and biased continuously to engage the film throughout each frame cycle, said crank being pivoted about an axis parallel to said arm;
(f) means for biasing said crank to form a loop between the gate and the sound-scanning device to take into account the difference between the instantaneous film velocities at the sound-scanning device and at the film gate;

(g) and a path for returning the film after passing the gate directly to said take-up reel;
(h) the arrangement of the sound-scanning device, the constant-speed device, and the film gate being such that the film moves in substantially a straight line across the apparatus except for said loop.

5. A sound-and-picture-on-film transport apparatus for a sound-and-picture reproducer including a sound-scanning device and a film gate comprising:
(a) means for supplying and taking up film;
(b) a constant-speed device disposed beyond the sound-scanning device in the direction of film motion for engaging the film and withdrawing it from said supply means;
(c) an intermittently operating mechanism for advancing the film past the film gate;
(d) an arm extending transversely of and biased continuously to engage the film throughout each frame cycle for normally forming a loop between the gate and the sound-scanning device to take into account the difference between the instantaneous film velocities at the sound-scanning device and at the film gate;
(e) a path for returning the film after passing the gate directly to said take-up means;
(f) and means continuously responsive to the average position of said arm for continuously controlling the speed of said operating mechanism to control said loop.

6. A sound-and-picture-on-film transport apparatus for a sound-and-picture reproducer including a sound-scanning device and a film gate comprising:
(a) means for supplying and taking up film;
(b) a constant-speed device disposed beyond the sound-scanning device in the direction of film motion for engaging the film and withdrawing it from said supply means;
(c) an intermittently operating mechanism including a motor for advancing the film past the film gate;
(d) an arm extending transversely of and biased continuously to engage the film throughout each frame cycle for normally forming a loop between the gate and the sound-scanning device to take into account the difference between the instantaneous film velocities at the sound-scanning device and at the film gate.
(e) a path for returning the film after passing the gate directly to said take-up means;
(f) and means continuously responsive to the average position of said arm for continuously controlling the speed of said motor to control said loop.

7. A sound-and-picture-on-film transport apparatus for a sound-and-picture reproducer including a sound-scanning device and a film gate comprising:
(a) means for supplying and taking up film;
(b) a constant-speed device disposed beyond the sound-scanning device in the direction of film motion for engaging the film and withdrawing it from said supply means;
(c) an intermittently operating mechanism including a constant-speed motor and a variable-speed drive mechanism for advancing the film past the film gate;
(d) an arm extending transversely of and biased continuously to engage the film throughout each frame cycle for normally forming a loop between the gate and the sound-scanning device to take into account the difference between the instantaneous film velocities at the sound-scanning device and at the film gate;
(e) a path for returning the film after passing the gate directly to said take-up means;
(f) and means continuously responsive to the average position of said arm for continuously and directly controlling said mechanism to control said loop.

8. A sound-and-picture-on-film transport apparatus for a sound-and-picture reproducer including a sound-scanning device and a film gate comprising:
 (a) means for supplying and taking up film;
 (b) a constant-speed device disposed beyond the sound-scanning device in the direction of film motion for engaging the film and withdrawing it from said supply means;
 (c) an intermittently operating mechanism for advancing the film past the film gate;
 (d) an arm extending transversely of and biased continuously to engage the film throughout each frame cycle for normally forming a loop between the gate and the sound-scanning device to take into account the difference between the instantaneous film velocities at the sound-scanning device and at the film gate;
 (e) said arm having a mechanical time constant such that it follows the variations in the length of the loop over each frame cycle;
 (f) a path for returning the film after passing the gate directly to said take-up means;
 (g) and means continuously responsive to the position of said arm for continuously controlling the speed of said operating mechanism to control said slack loop.

9. A sound-and-picture-on-film transport apparatus for a sound-and-picture reproducer including a sound-scanning device and a film gate comprising:
 (a) means for supplying and taking up film
 (b) a constant-speed device disposed beyond the sound-scanning device in the direction of film motion for engaging the film and withdrawing it from said supply means;
 (c) an intermittently operating mechanism for advancing the film past the film gate;
 (d) an arm extending transversely of said film and continuously acting on the same to form a loop between the gate and the sound-scanning device to take into account the difference between the instantaneous film velocities at the sound-scanning device and at the film gate;
 (e) said arm having a mechanical time constant such that it follows the variations in the length of the loop over each frame cycle;
 (f) a movable supporting member for said arm having a mechanical time constant such that it is unresponsive to the frame frequency oscillations of said arm;
 (g) a path for returning the film after passing the gate directly to said take-up means;
 (h) and means continuously responsive to the position of said member for continuously controlling the speed of said operating mechanism to control said slack loop.

10. A sound-and-picture-on-film transport apparatus for a sound-and-picture reproducer including a sound-scanning device and a film gate comprising:
 (a) means for supplying and taking up film;
 (b) a constant-speed device disposed beyond the sound-scanning device in the direction of film motion for engaging the film and withdrawing it from said supply means;
 (c) an intermittently operating device for advancing the film past the film gate;
 (d) an arm extending transversely of and biased continuously to engage the film throughout each frame cycle for normally forming a loop between the gate and the sound-scanning device to take into account the difference between the instantaneous film velocities at the sound-scanning device and at the film gate;
 (e) a path for returning the film after passing the gate directly to said take-up means;
 (f) and means continuously responsive to the position of said arm for varying the speed of one of said devices to control said loop.

References Cited by the Examiner

UNITED STATES PATENTS

| | | | |
|---|---|---|---|
| 1,192,171 | 7/1916 | Dixon | 226—44 X |
| 1,466,750 | 9/1923 | Peterson | 88—16.2 |
| 1,833,015 | 11/1931 | Battey | 88—16.2 |
| 1,889,798 | 12/1932 | Bullis | 88—17 |
| 1,965,173 | 7/1934 | Canton | 88—16.2 |
| 2,043,354 | 6/1936 | Mallina | 226—44 |
| 2,050,494 | 8/1936 | Lindenberg | 88—16.2 |
| 2,095,831 | 10/1937 | Philips | 88—16.2 |
| 2,214,468 | 9/1940 | Lannerd | 88—17 |
| 2,243,112 | 5/1941 | Morrissey | 88—16.2 |
| 2,307,806 | 1/1943 | Schnoor | 242—55.19 |
| 2,322,144 | 6/1943 | Kirschbaum | 88—16.2 X |
| 2,371,836 | 3/1945 | Materson | 88—17 |
| 2,420,798 | 5/1947 | Shepherd | 88—16.2 |
| 2,773,416 | 12/1956 | Kleinerman | 88—16.2 |
| 2,911,882 | 11/1959 | Hicks | 242—55.13 X |
| 2,982,172 | 5/1961 | Berkenhoff | 88—16.2 |
| 3,041,925 | 7/1962 | Bavoro | 88—18.7 |
| 3,083,925 | 4/1963 | Schoebel | 88—16.2 |
| 3,087,686 | 4/1963 | Wren | 242—55.13 |

FOREIGN PATENTS 836,449   6/1960   Great Britain.

MERVIN STEIN, *Primary Examiner.*

G. F. MAUTZ, *Assistant Examiner.*